United States Patent [19]

McKinney

[11] 4,312,486

[45] Jan. 26, 1982

[54] VARIABLE CAMBER TRAILING EDGE FOR AIRFOIL

[75] Inventor: Maurice E. McKinney, Bellevue, Wash.

[73] Assignee: The Boeing Company, Seattle, Wash.

[21] Appl. No.: 77,333

[22] Filed: Sep. 20, 1979

[51] Int. Cl.³ .............................................. B64C 3/50
[52] U.S. Cl. .................................... 244/215; 244/219
[58] Field of Search ............... 244/213, 214, 215, 218, 244/219

[56] References Cited

U.S. PATENT DOCUMENTS 4,053,124 10/1977 Cole ..................................... 244/219
4,131,253 12/1978 Zapel .................................... 244/219

*Primary Examiner*—Charles E. Frankfort
*Attorney, Agent, or Firm*—Hughes, Barnard & Cassidy

[57] ABSTRACT

An airfoil having a support frame, a trailing edge end section, and upper and lower variable camber skin sections extending rearwardly from the support frame to the trailing edge end section. A walking beam is positioned between the upper and lower variable camber skin sections, and comprises a forward positioning section and a rearwardly extending locating arm. The positioning section is connected to the lower swing ends of two pivot links in a manner that forward or rearward movement of the positioning section causes the locating arm of the walking beam to rotate, respectively, downwardly or upwardly. A whiffle tree beam is connected by its forward end to the support frame and by its rear end is pivotally connected to the trailing edge end section, with the whiffle tree beam being connected at an intermediate portion thereof to the rear end of the locating arm of the walking beam. A tilting arm is connected to the locating arm, to the whiffle tree beam and to the trailing edge section. Thus, downward or upward rotational movement of the locating arm of the walking beam causes a corresponding downward or upward rotational movement of the trailing edge end section of a correspondingly greater degree of rotation, relative to the locating arm.

14 Claims, 9 Drawing Figures

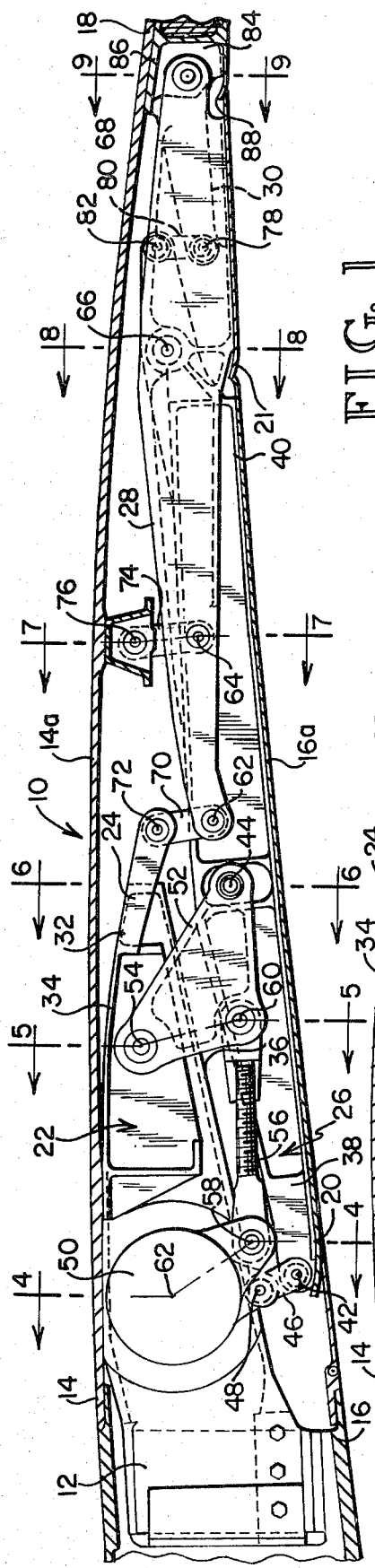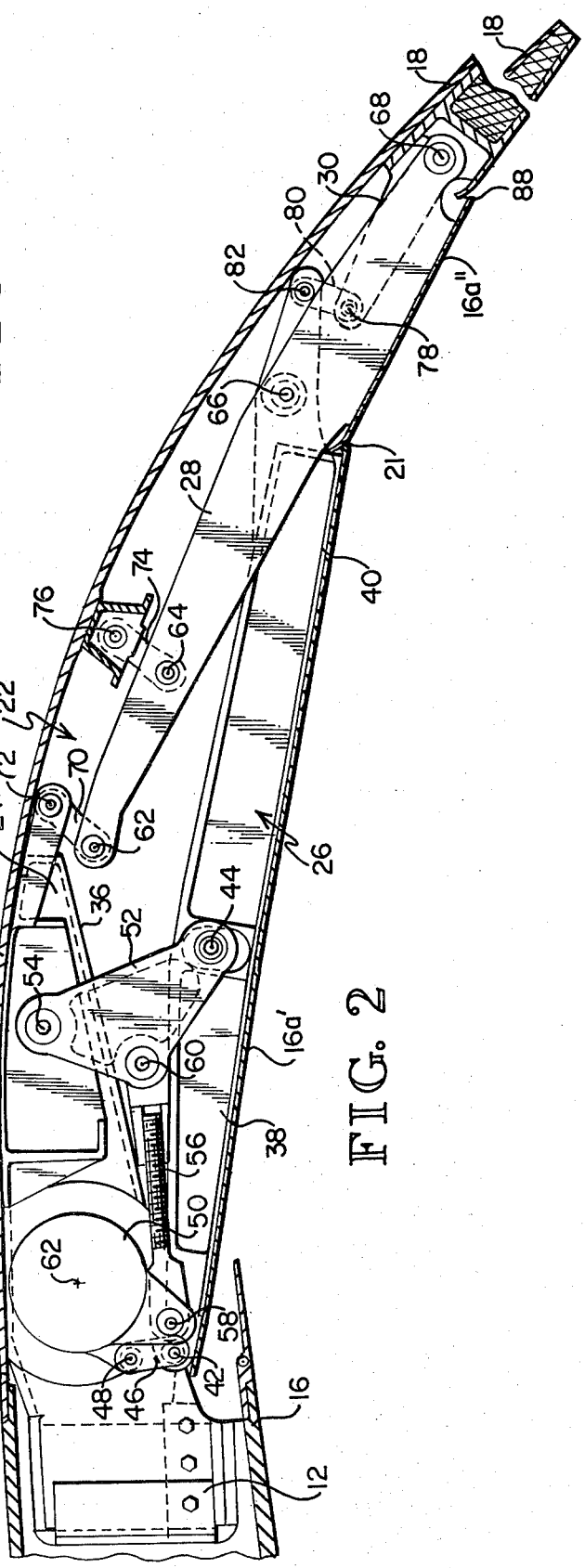

4,312,486

VARIABLE CAMBER TRAILING EDGE FOR AIRFOIL

BACKGROUND OF THE INVENTION

A. Field of the Invention

The present invention relates to a variable camber airfoil, and more particularly to an apparatus particularly adapted to vary the camber of the trailing edge portion of an airfoil.

B. Brief Description of the Prior Art

A common way of modifying the lift characteristics of an airfoil for low speed operation is to use leading edge and trailing edge devices which either pivot or slide outwardly from the airfoil to a deployed position. With many such devices, there is the problem that during deployment, there is an interruption in smooth air flow over the airfoil. Also, many of these devices are not able to be deployed to intermediate positions while maintaining the proper flow of air over the airfoil. Accordingly, there have appeared in the prior art various devices to vary the shape of the airfoil itself in a manner to change the camber and thus modify its lift characteristics.

U.S. Pat. No. 4,131,253, Zapel, illustrates a trailing edge flap where there is a walking beam positioned between upper and lower variable camber skin sections, and comprises a forward positioning section and a rearwardly extending locating arm. The positioning section is connected to the lower swing ends of two pivot links which extend upwardly and convergently toward one another to connect with a fixed frame at spaced locations so that forward or rearward movement of the positioning section causes a locating arm of the walking beam to rotate, respectively, downwardly or upwardly. A trailing edge beam is connected by its forward end to the support frame, and by its rear end to the trailing edge end section, with the trailing edge beam being connected at an intermediate portion thereof to the rear end of the locating arm of the walking beam. Thus, downward or upward rotational movement of the locating arm of the walking beam causes a corresponding downward or upward rotational movement of the trailing edge end section of a correspondingly greater degree of rotation, relative to the locating arm.

It is an object of the present invention to provide a variable camber airfoil, where a relatively high degree of deflection can be obtained, by linkage positioned within a relatively small operating envelope in the wing.

SUMMARY OF THE INVENTION

The airfoil of the present invention comprises a support frame, upper and lower skin sections attached to the frame, and a trailing edge end section. There is a variable camber upper skin section extending from said frame to said trailing edge end section. Also, a variable camber lower skin section extends from said frame to the trailing edge end section.

A walking beam is positioned between the upper and lower variable camber skin sections. The walking beam comprises a forward positioning section and a rearwardly extending locating arm. Positioning means are provided to locate the forward positioning section of the walking beam relative to said frame. The positioning means comprises:

1. a first forward connecting means interconnecting a forward connecting portion of the positioning section to the frame for movement of the forward connecting portion back and forth on an upwardly and forwardly directed path, 2. a second rearward connecting means interconnecting a rearward connecting portion of the positioning section of the walking beam to the frame for movement back and forth on a upwardly and rearwardly directed path.

This arrangement causes the positioning section to be constrained to move in a manner that forward movement thereof rotates the locating arm downwardly, and rearward movement thereof rotates the locating arm upwardly.

There is a whiffle tree beam which comprises a forward portion connected to the frame, and a rear portion connected to the trailing edge end section in a manner to permit relative rotation between the rear portion and the trailing edge end section. Also, the whiffle tree beam has an intermediate portion connected to the locating arm at an intermediate location in a manner to permit relative rotation between the intermediate potion and the locating arm.

There is a tilting arm comprising a forward portion connected to the locating arm at an end location positioned rearwardly of the intermediate location in a manner to be rotatable with respect to the locating arm. Also, the tilting arm comprises a rear portion connected to the trailing edge section in a manner to cause the trailing edge end section to be rotatable with the tilting arm. In the preferred form, the rear portion of the tilting arm is rigidly connected to the trailing edge end section.

With this arrangement, downward and upper rotational movement of the locating arm of the walking beam causes a corresponding downward or upward rotational movement of the whiffle tree beam and the tilting arm of a correspondingly greater degree of rotation relative to the locating arm. Also, the rotation of the tilting arm is relatively greater than that of the whiffle tream beam.

Desirably, the forward portion of the whiffle tree beam is mounted to the frame for forward movement relative to the frame during downward rotational movement of the whiffle tree beam. Specifically, the forward portion of the whiffle tree beam is connected through a pivot link to the frame.

In the preferred embodiment, at least one of the forward and rearward connecting means for the walking beam comprises a pivot link having a pivot connection to the frame and a swing end connection to the walking beam. Also, the forward connecting means of the positioning means for the walking beam constrains a forward connecting portion of the walking beam for general rotation about a first pivot axis, and a second rearward connecting means for the positioning means constrains the rearward connecting portion of the positioning section of the walking beam for general rotational movement about a second pivot axis positioned rearwardly of the first pivot axis for the forward connecting means. Thus, rotational movement of the positioning section of the walking beam is about a point of rotation spaced from the first and second axes.

In the specific embodiment shown herein, the forward connecting means for the walking beam comprises a first pivot link pivotally connected to a rotatable torque tube. The second rearward connecting means comprises a second pivot link pivotally mounted to the frame at a location rearwardly of the first pivot link.

In the preferred embodiment, the variable camber lower skin section comprises at least two lower skin portions. There is a first lower skin portion connected to the walking beam so as to be rotatable therewith, and a second lower skin portion connected to the whiffle tree beam and rotatable therewith.

Desirably, there is a slave connecting means interconnecting the variable camber upper skin section with the whiffle tree beam. Thus, downward rotation of the whiffle tree beam causes a downward deflection of the variable camber upper skin section. Preferably the slave connecting means connects to the whiffle tree beam at a location between the forward portion of the whiffle tree beam and the intermediate location of the whiffle tree beam. Also, in the preferred form the tilting arm is connected to the locating arm through a tilting arm link pivotally connected to both the tilting arm and the locating arm.

Other features of the present invention will become apparent from the following detailed description.

BRIEF DESCRIPTION OF THE DRAWINGS

FIG. 1 is a sectional view of a rear variable camber section of an airfoil made according to the present invention, taken transverse to the span-wise axis of the airfoil, and showing the airfoil in its uncambered position;

FIG. 2 is a view similar to FIG. 1 showing the rear variable camber section of the airfoil in its full downwardly cambered position;

DESCRIPTION OF THE PREFERRED EMBODIMENT

Figure 3:
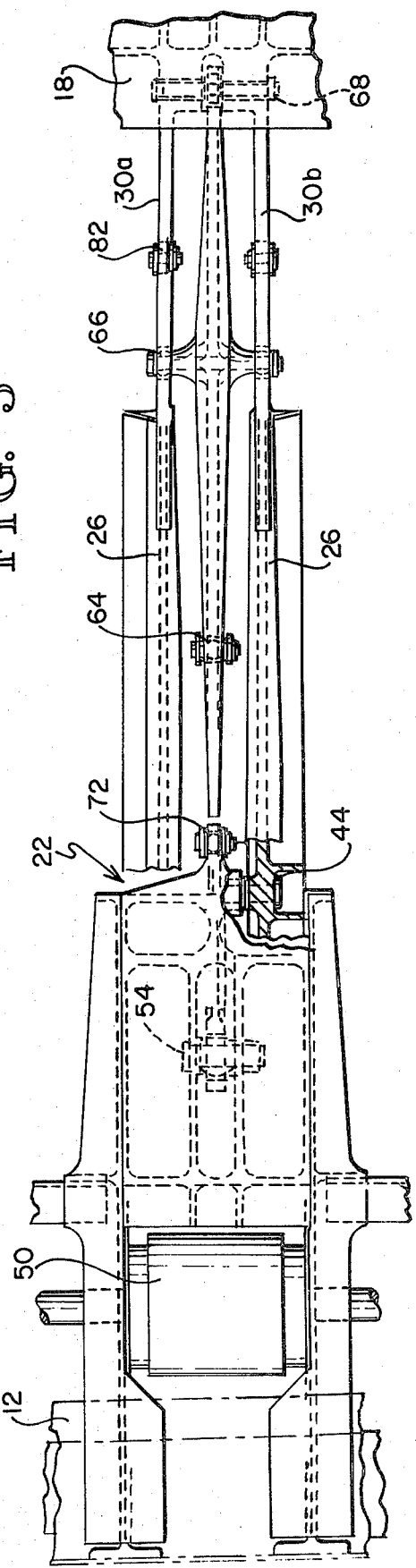
FIG. 3 is a top view of the rear variable camber section, with the top skin section broken away to show the operating components thereof.
Figure 5:
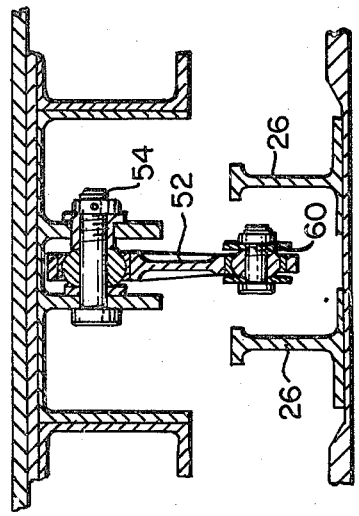
FIGS. 4, 5, 6, 7, 8 and 9 are sectional views taken along, respectively, lines 4, 5, 6, 7, 8 and 9 of FIG. 1.
Figure 4:
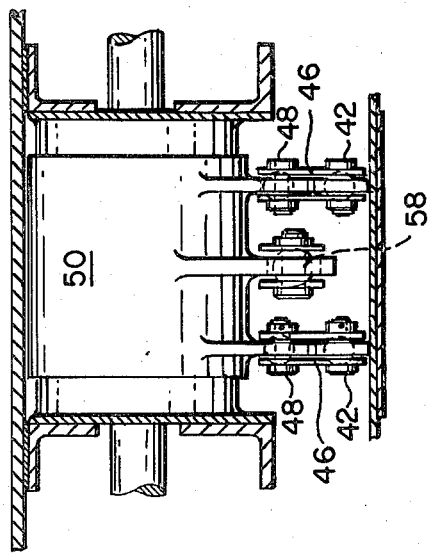
Figure 6:
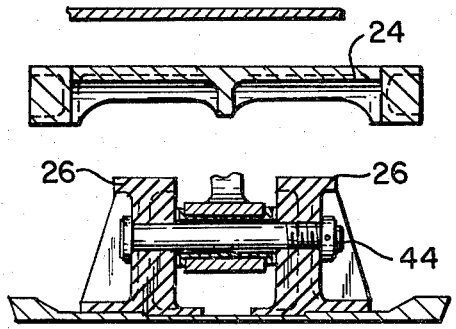
Figure 7:
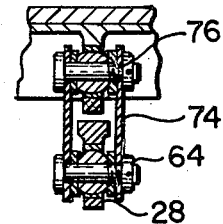
Figure 8:
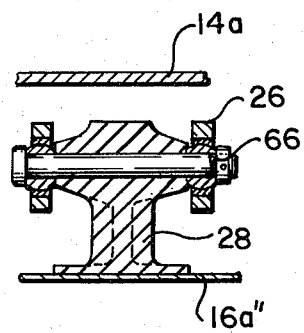
Figure 9:
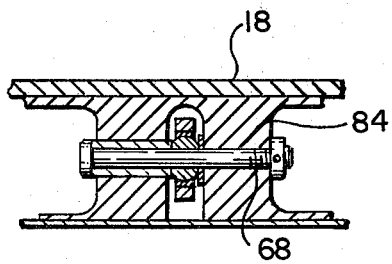

Since in the preferred embodiment described herein the invention is incorporated in the trailing edge portion of an airfoil 10, for convenience of illustration, only the trailing edge portion of the airfoil is shown in the accompanying drawing. The airfoil 10 comprises a main support frame 12 to which are attached upper and lower skin sections 14 and 16, respectively. At the extreme rear end of the airfoil 10 there is a trailing edge end section 18, at which the upper and lower skins 14 and 16 join to one another to form the trailing edge of the airfoil 10. In FIGS. 1 and 2, for convenience of illustration, only a forward portion of the trailing edge portion 18 is shown.

There is a variable camber upper skin section 14a which extends from the upper rear portion of the frame 12 to the trailing edge end section 18, and also a variable camber lower skin section 16a which extends from the lower portion of the frame 12 to the trailing edge end section 18. At its forward end, the variable camber lower skin section 16a overlaps at 20 to prevent relative slide movement therebetween. The variable camber lower skin section 16a is, in the present embodiment, actually made in two overlapping sections, namely a forward section 16' and a rear section 16a''. These two sections, 16a' and 16a'' overlap one another at 21.

Before describing specifically the components and operation of the present invention, it is believed that a better understanding will be achieved by indicating briefly at this time the main functions accomplished. The present invention is designed to be able to maintain the airfoil 10 in a substantially uncambered position as shown in FIG. 1, and be able to move the airfoil to a full down cambered position, as shown in FIG. 2. Also, the trailing edge portion of the airfoil can be deflected upwardly to an upward cambered position. This is done in a manner that the upper and lower skins 14 and 16 (particularly the variable camber upper section 14a) are at all times throughout the deployment in a relatively smooth curve with no substantial surface discontinuities which might induce flow separation. This requires that not only both the downward and rotational components of movement of the trailing edge end section 18 be properly co-ordinated, but also that the distance of the trailing edge end section from the frame 12 be properly controlled so that the variable camber upper skin section 14a can at all times assume a proper curvature which increases proportionately with increased deflection of the trailing edge end section 18. Also, this should be done in a manner that the operating components can function within a relatively narrow operating envelope in the trailing edge portion of the airfoil.

To proceed to a detailed description of the present invention, the trailing edge portion of the airfoil 10 is provided with a plurality of linkage units 22 located at intervals along the span-wise length of the airfoil 10. For convenience of illustration, only one of the units 22 is shown herein. The main components of the linkage unit 22 are a support bracket 24 which is integral with the support frame 12, a walking beam 26, a whiffle tree beam 28 and a tilting arm 30.

The bracket 24 comprises a pair of rearwardly extending parallel bracket plates 32, spaced moderately from one another, and extending into the area between the forward portions of the upper and lower variable camber sections 14a and 16a. The upper and lower edge portions 34 and 36 of the bracket plates 32 are contoured in a manner to curve convergently toward one another in a rearward direction, to permit downward and upward deflection of the upper and lower variable camber skin sections 14a and 16a.

The walking beam 26 has identical right and left sections, rigidly connected to one another and positioned inside of the bracket plates 32. The walking beam comprises a forward positioning section 38 and an integral rearwardly extending locating arm 40. The positioning section 38 has a first forward connecting point 42 and a second rearward connecting point 44.

A first forward positioning link 46, made up of right and left link portions, is pivotally connected at 48 to a torque tube 50. The two positioning link portions 46 connect at the lower end at the forward connecting points 42 of the two sections of the walking beam 26. There is a second rear connecting link 52 connected by its upper end at 54 to the support bracket 24. This second positioning link 52 has a lower swing end pivotally connected at the rearward connecting point 44 of the walking beam 26. An actuating link 56 is connected at its forward end 58 to the torque tube 50, and by its rear end at 60 to the rear positioning link 52. The connecting point 60 is approximately midway between the upper pivot point 54 and the lower connecting point 44, and moderately forward of a line drawn between the two points 54 and 44.

With reference to FIG. 1, it can be seen with the airfoil 10 in its uncambered position, the pivot point 54 is positioned above and forwardly of the rear connecting point 44. Thus, when the torque tube 50 is rotated so as to move the actuating link 56 forwardly, the connecting point 44 swings downwardly and forwardly. Also, with the airfoil 10 in its uncambered position, the forward positioning link 46 is approximately directly beneath the center axis of rotation 62 of the torque tube 50. Thus, as the torque tube 50 rotates in a manner to move the actuating link 56 forwardly, the positioning link 46 moves upwardly and forwardly to move the connecting point 42 of the walking beam 26 in an upward and forward direction. This arrangement of the two positioning links 46 and 52 relative to the walking beam 26 is particularly critical in the present invention with regard to the proper location of the walking beam 26 in its movements to its various cambered positions. This will be explained more fully hereinafter.

The whiffle tree beam 28 has a forward connecting point 62, a forward intermediate connecting point 64, a rear intermediate connecting point 66, and a rear connecting point 68. The forward point 62 is connected by a short link 70 to the rear end of the bracket 24 (and rearwardly of the pivot connection 54), so that relative rotation is permitted between the whiffle tree beam 28 and the bracket 24. This link 70 is pivotally connected at its upper end 72 to the bracket 24.

The forward intermediate connecting point 64 is pivotally connected through a link 74 to the upper skin section 14a, this link 74 having an upper pivot connection 76 to the skin portion 14a. Thus, when the beam 28 swings downwardly or upwardly relative to the bracket 24, the link 74 acts as a slave link to bring the upper cambered skin section 14a to its proper contour.

The rear intermediate connecting point 66 of the whiffle tree beam 28 has a direct pivot connection to the locating arm portion 40 of the walking beam 26. The rear connecting point 68 has a direct pivot connection to the forward end of the trailing edge section 18.

To indicate at this time briefly the operating movement of the whiffle tree beam 28, with reference to FIG. 1, it can be seen in the uncambered position of the airfoil 10, the beam 28 is in substantial alignment with the cord-wise axis of the airfoil 10. When the airfoil 10 is moved to its downward cambered position, as shown in FIG. 2, the downward rotational movement of the locating arm 40 of the walking beam 26 causes a corresponding downward rotational movement of the whiffle tree beam 28 of a greater degree of rotation relative to the locating arm 40. Although not illustrated herein, it can likewise be understood that when the airfoil 10 is moved to its up cambered position, the upward rotational movement of the locating arm 40 causes an upward rotational movement of the whiffle tree beam 28 of a correspondingly greater degree of rotation relative to the locating arm 40.

The forward lower variable camber section 16a' is connected directly to the walking beam 26, while the rear lower variable camber section 16a" is connected directly to the lower part of the rear portion of the whiffle tree beam 28. Thus, when the trailing edge portion of the wing 10 is deflected downwardly the overlapping portions 20 and 21 permit overlapping slide motion to provide a substantially continuous aerodynamic surface over the lower cambered section 16a. Likewise when the trailing edge of the wing 10 is deflected upwardly, the lower skin portions at 20 and 21 remain in overlapping relationship also to provide a substantially continuous aerodynamic surface.

The tilting arm 30 has at its forward end a connecting point 78, by which it is pivotally connected through a link 80 to the extreme rear end of the locating arm portion 40 of the walking beam 26 at a pivot location 82. Thus, the tilting arm 30 is able to rotate relative to the walking beam 26. As shown herein, the tilting arm 30 is made of right and left sections, 30a and 30b having a rigid connection at 84 to the forward spar 86 of the trailing edge section 18. The rear pivot connection 68 of the whiffle tree beam 28 is also at the location of the forward spar 86.

To indicate briefly the operation of the tilting arm 30, it will be noted that the forward connection locations of 78 and 82 of the tilting arm 30 are positioned rearwardly of the connecting location 66 between the walking beam 26 and the whiffle tree beam 28. Accordingly, when the trailing edge portion of the wing 10 is moved to its downward cambered position, with the rotation of the whiffle tree beam 28 being relatively greater than the rotation of the walking beam 26, the connecting locations 82 and 78 move upwardly relative to the whiffle tree beam 28. This causes a rotation of the tilting arm 30 which is relatively greater than the rotation of the whiffle tree beam 28.

To describe the overall operation of the present invention, as shown in FIG. 1, with the airfoil 10 in its substantially uncambered position, the walking beam 26, the whiffle tree beam 28, and the tilting arm 30 are in substantial alignment with the chordwise axis of the airfoil 10 so that the upper and lower skin sections 14 and 16 are in a substantially uncambered position. To move the trailing edge portion of the airfoil 10 to its downward cambered position, the torque tube 50 is rotated (clockwise as seen in FIGS. 1 and 2) to move the actuating link 56 forwardly and also to carry the forward positioning link 46 forwardly and upwardly. As indicated previously, the forward connecting point 42 of the walking beam 26 is caused to move forwardly and upwardly, while the rear connecting point 44 is caused to move downwardly and forwardly. This causes the walking beam 26 to rotate about an instantaneous center of rotation which is above the forward positioning portion 38 of the walking beam 26.

At the same time, the rear intermediate connecting point 66 between the locating arm 40 of the walking beam 26 and the whiffle tree beam 28 is caused to rotate downwardly a greater distance relative to the downward rotation of the point 44. As indicated previously, this causes the whiffle tree beam 28 to rotate to a greater degree relative to the walking beam 26 and to move forwardly about the link 70.

Finally, the relative rotation of the beams 26 and 28 causes a rotational movement of the tilting arm 30, which rotation is relatively greater than that of the whiffle tree beam 28. The overall effect of this is that the three main moveable members 26, 28 and 30 of the linkage 22 cause the trailing edge portion of the wing to deflect downwardly in a curve which follows generally the contour of a constant curvature. As indicated previously, the two overlapping areas 20 and 21 of the lower skin section 16a' and 16a" provide the equivalent of a continuous surface for the rear portion of the lower skin surface 16. Additionally, there is an overlapping area at 88 between the lower surface of the trailing edge section 18 and the rear lower skin portion 16a". This provides a continuity in the skin surface between the skin section 16a" and the lower skin surface 90 of the trailing edge section 18.

It has been found that the particular arrangement of the linkage system of the present invention enables substantial downward deflection of the trailing edge portion of the wing (e.g. as great as 30° downward deflection or possibly more). Yet, the linkage system can be confined within an operating envelope in the narrowing trailing edge portion of the wing of relatively small dimension. Also, the relative rotation of the three main components 26, 28 and 30 is such that with the slave link 74 connected to the middle whiffle tree beam 28, the upper cambered surface portion 14a is held in the proper curved contour.

While not specifically illustrated herein, it is to be understood that the trailing edge portion of the wing 10 can be defected upwardly by rotating the torque tube 50 in the opposite direction. This moves the actuating link 56 rearwardly to rotate the locating arm 40 of the walking beam 26 upwardly. The whiffle tree beam 28 and the tilting arm 30 rotate upwardly in a manner similar to that described previously with reference to the downward deflection of the trailing edge section 18. Since this is readily understandable from the foregoing description, a detailed description of the positioning of the components in the up cambered position will not be given herein.

What is claimed is:
1. A variable camber airfoil comprising:
   a. a support frame,
   b. upper and lower skins attached to said frame,
   c. a trailing edge end section,
   d. a variable camber upper skin section extending from said frame to said trailing edge end section,
   e. a variable camber lower skin section extending from said frame to said trailing edge end section,
   f. a walking beam positioned between the upper and lower variable camber skin sections, said walking beam comrpising a forward positioning section and a rearwardly extending locating arm,
   g. positioning means to locate said forward positioning section of the walking beam relative to said frame, said positioning means comprising:
      (1) a first forward connecting means interconnecting a forward connecting portion of the positioning section of the walking beam to said frame for movement of the forward connecting portion back and forth on an upwardly and forwardly directed path,
      (2) a second rearward connecting means interconnecting a rearward connecting portion of the positioning section of the walking beam to the frame for movement back and forth on an upwardly and rearwardly directed path, whereby said positioning section is constrained to move in a manner that forward movement thereof rotates said locating arm downwardly, and rearward movement thereof rotates said locating arm upwardly,
   h. a whiffle tree beam comprising:
      (1) a forward portion connected to said frame,
      (2) a rear portion connected to said trailing edge end section in a manner to permit relative rotation between said rear portion and said trailing edge end section,
      (3) an intermediate portion connected to said locating arm at an intermediate location in a manner to permit relative rotation between said intermediate portion and said locating arm,
   i. a tilting arm compring:
      (1) a forward portion connected to said locating arm at an end location positioned rearwardly of said intermediate location in a manner to be rotatable with respect to said locating arm,
      (2) a rear portion connected to said trailing edge section in a manner to cause said trailing edge end section to be rotatable with said tilting arm whereby downward and upward rotational movement of the locating arm of the walking beam causes a corresponding downward or upward rotational movement of the whiffle tree beam and the tilting arm of a correspondingly greater degree of rotation relative to said locating arm, with the tilting arm rotating to a greater degree relative to the whiffle tree beam.

2. The airfoil as recited in claim 1, wherein the forward portion of the whiffle tree beam is mounted to said frame for forward movement relative thereto during downward rotational movement of the whiffle tree beam.

3. The airfoil as recited in claim 2, wherein there is a pivot link connecting the forward end of the whiffle tree beam to the frame.

4. The airfoil as recited in claim 1, wherein at least one of said forward and rearward connecting means comprises a pivot link having a pivot connection to said frame and a swing end connection to said walking beam.

5. The airfoil as recited in claim 1, wherein the forward connecting means of the positioning means for the walking beam constrains the forward connecting portion of the walking beam for general rotational movement about a first pivot axis, and the second rearward connecting means of the positioning means for the walking beam constrains the rearward connecting portion of the positioning section for general rotational movement about a second pivot axis positioned rearwardly of the first pivot axis for the forward connecting means, whereby rotational movement of the positioning section of the walking beam is about a point of rotation spaced from the first and second axes.

6. The airfoil as recited in claim 5, wherein said forward connecting means for the positioning section comprises a first pivot link pivotally connected to a rotatably mounted torque tube, and said second rearward connecting means for the positioning section of the walking beam comprises a second pivot link pivotally mounted to the frame at a location rearwardly of the first pivot link.

7. The airfoil as recited in claim 6, wherein the forward portion of the whiffle tree beam is mounted to said frame for forward movement relative thereto during downward rotational movement of the whiffle tree beam.

8. The airfoil as recited in claim 1, wherein said variable camber lower skin section comprises at least two lower skin portions, namely a first lower skin portion connected to said walking beam and rotatable therewith, and a second lower skin portion connected to said whiffle tree beam and rotatable therewith.

9. The airfoil as recited in claim 1, wherein there is slave connecting means interconnecting said variable camber upper skin section with said whiffle tree beam, wherein downward rotation of said whiffle tree beam causes downward deflection of said variable camber upper skin section.

10. The airfoil as recited in claim 9, wherein said slave connecting means connects to said whiffle tree beam at a location between the forward portion of the whiffle tree beam and the intermediate location of the whiffle tree beam.

11. The airfoil as recited in claim 1, wherein there is a tilting arm link interconnecting the forward portion of the tilting arm to said locating arm.

12. The airfoil as recited in claim 1, wherein:
   a. said variable camber lower skin section comprises at least two lower skin portions, namely a first lower skin portion connected to said walking beam and rotatable therewith, and a second lower skin portion connected to said whiffle tree beam and rotatable therewith,
   b. there is a slave connecting means interconnecting said variable camber upper skin section with said whiffle tree beam, wherein downward rotation of said whiffle tree beam causes downward deflection of said variable camber upper skin section.

13. The airfoil as recited in claim 1, wherein:
   a. the forward portion of the whiffle tree beam is mounted to said frame for forward movement relative thereto during downward rotational movement of the whiffle tree beam,
   b. the forward connecting means of the positioning means for the walking beam constrains the forward connecting portion of the walking beam for general rotational movement about a first pivot axis, and the second rearward connecting means of the positioning means for the walking beam constrains the rearward connecting portion of the positioning section for general rotational movement about a second pivot axis positioned rearwardly of the first pivot axis for the forward connecting means, whereby rotational movement of the positioning section of the walking beam is about a point of rotation spaced from the first and second axes,
   c. there is a tilting arm link interconnecting the forward portion of the tilting arm to said locating arm.

14. The airfoil as recited in claim 1, wherein:
   a. the forward portion of the whiffle tree beam is mounted to said frame for forward movement relative thereto during downward rotational movement of the whiffle tree beam,
   b. the forward connecting means of the positioning means for the walking beam constrains the forward connecting portion of the walking beam for general rotational movement about a first pivot axis, and the second rearward connecting means of the positioning means for the walking beam constrains the rearward connecting portion of the positioning section for general rotational movement about a second pivot axis positioned rearwardly of the first pivot axis for the forward connecting means, whereby rotational movement of the positioning section of the walking beam is about a point of rotation spaced from the first and second axes,
   c. said forward connecting means for the positioning section comprises a first pivot link pivotally connected to a rotatably mounted torque tube, and said second rearward connecting means for the positioning section of the walking beam comprises a second pivot link pivotally mounted to the frame at a location rearwardly of the first pivot link,
   d. the forward portion of the whiffle tree beam is mounted to said frame for forward movement relative thereto during downward rotational movement of the whiffle tree beam,
   e. said variable camber lower skin section comprises at least two lower skin portions, namely a first lower skin portion connected to said walking beam and rotatable therewith, and a second lower skin portion connected to said whiffle tree beam and rotatable therewith,
   f. there is slave connecting means interconnecting said variable camber upper skin section with said whiffle tree beam, wherein downward rotation of said whiffle tree beam causes downward deflection of said variable camber upper skin section.

* * * * *